March 19, 1940. H. R. VAN VLECK 2,193,893
TRACTOR TRAILER POWER TRANSMITTING MEANS
Filed Oct. 17, 1938 2 Sheets-Sheet 1
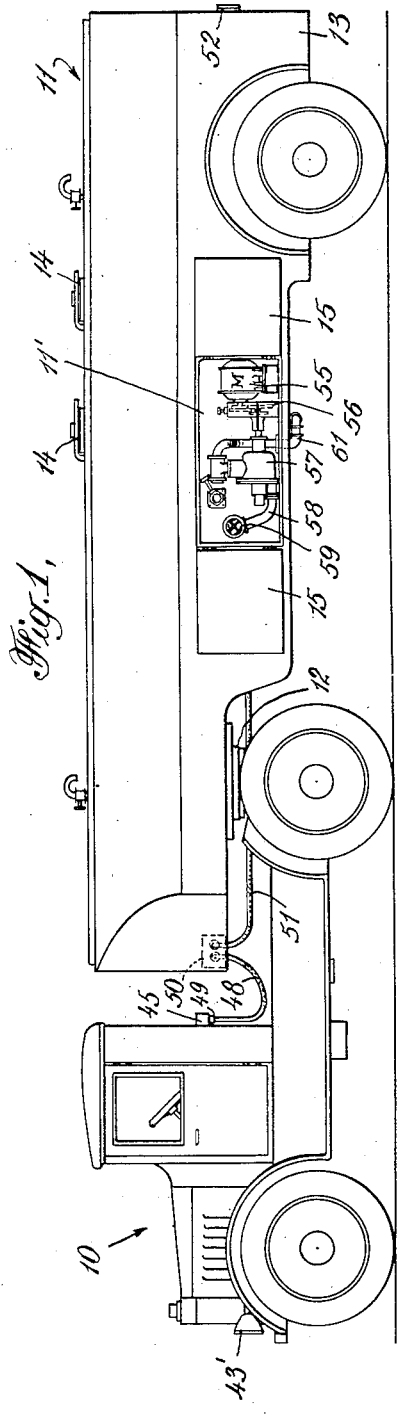
INVENTOR
H. Russ Van Vleck
BY
Pennie Davis Marvin & Edmonds
ATTORNEY

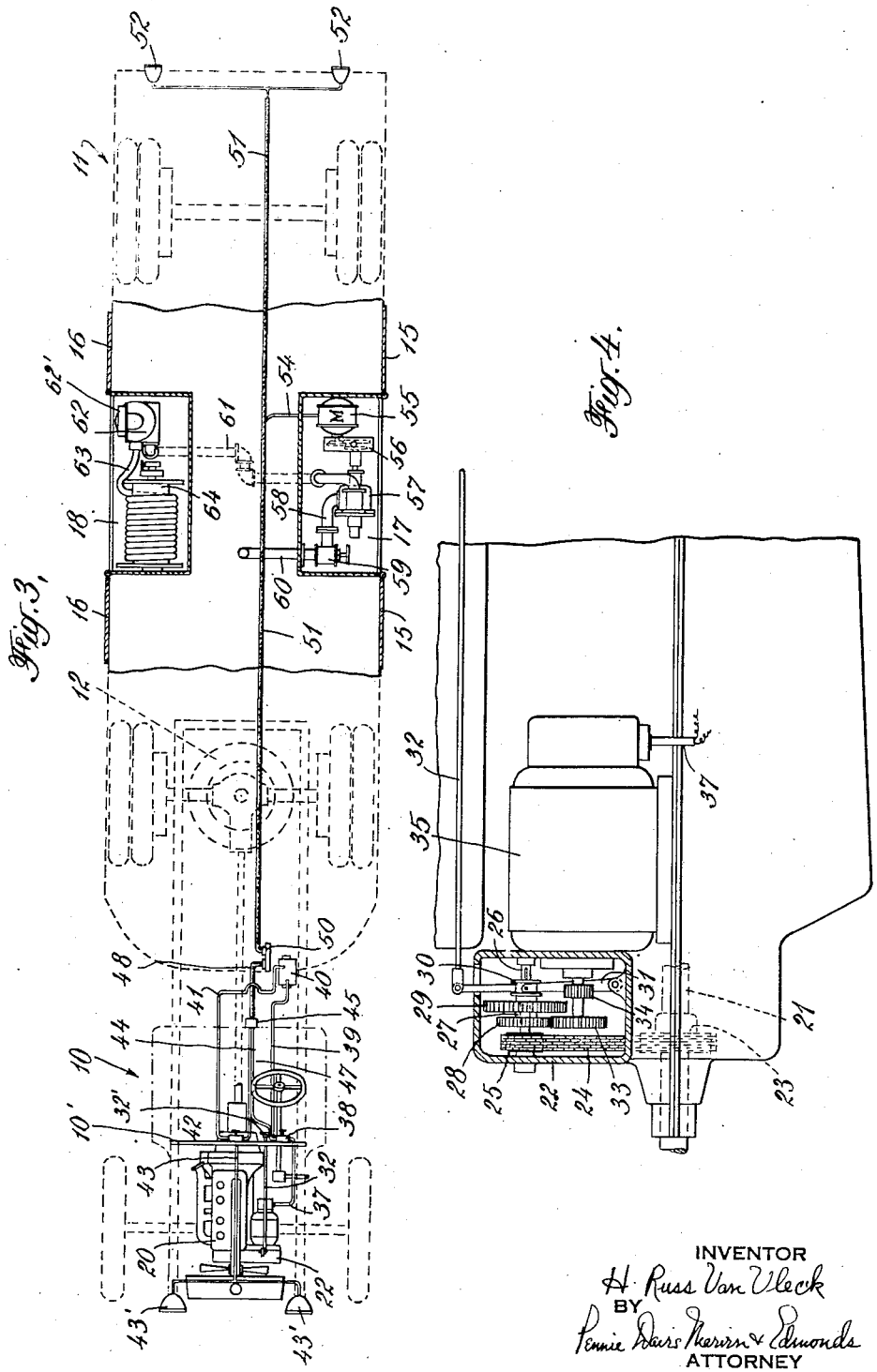

Patented Mar. 19, 1940

2,193,893

UNITED STATES PATENT OFFICE 2,193,893

TRACTOR TRAILER POWER TRANSMITTING MEANS

Horace Russ Van Vleck, Upper Montclair, N. J.

Application October 17, 1938, Serial No. 235,344

5 Claims. (Cl. 180—14)

This invention relates to vehicles for transport fluids, such as petroleum products and the like, and has particular reference to a novel vehicle of this type including a tractor and a tank trailer, in which the apparatus for pumping the fluid into or from the tank is located on the trailer and is operated by power transmitted from the tractor engine through a flexible connection between the tractor and trailer.

It has been a common practice heretofore to transport fluids over highways by vehicles made up of tractor and tank trailer units releasably connected through a flexible coupling or "fifth wheel." These vehicles offer numerous advantages over those of the single unit type, among which are that the former may generally be made with larger load capacities, and the tractor unit may be detached from the tank trailer when the latter is under repair or otherwise idle, and used with another trailer, or the trailer may be detached and used with another tractor.

Vehicles of the type including a tractor and a tank trailer are generally provided with an apparatus for pumping the fluid from the tank at the point of delivery. In these vehicles, as commonly made, the pump is mounted on the tractor and driven by the tractor engine, the fluid being drawn from the tank through a conduit leading to the tractor and then delivered from the pump through a hose. With this construction, it is necessary to provide a flexible pipe or hose connection between the trailer and tractor, which generally extends along the axis of the "fifth wheel" and therefore involves mechanical difficulties, and in detaching the trailer from the tractor, the pipe or hose connection must first be uncoupled which requires considerable time and usually results in the loss of at least part of the fluid in the connection. Also, with this construction, the hose and the reel on which it is usually mounted are located on the tractor where the space required for these bulky parts is not readily available.

The present invention, therefore, is directed to the provision of a novel vehicle having tractor and tank trailer units, which overcomes the objections to prior vehicles of this type and in which the fluid pump is located on the trailer but is supplied with power from the tractor engine through a simple connection.

A vehicle made in accordance with my invention comprises a tractor on which is mounted a generator adapted to be driven by the tractor engine, preferably through a variable speed transmission, such as change speed gearing. A trailer carrying a tank body is coupled to the tractor through a "fifth wheel," or the like, and has mounted thereon a device for pumping fluid into or out of the tank. In the preferred form of the new vehicle, a hose is connected to the outlet side of the pump and is wound around a reel on the trailer adjacent the pump. The pump is adapted to be driven by an electric motor on the trailer, preferably through another variable speed transmission, and the motor is supplied with electric current through suitable wiring leading from the generator on the tractor. If desired, the trailer may be provided with a meter connected to either the inlet or the outlet side of the pump to measure the quantity of fluid delivered.

It will be apparent that in the new vehicle, the apparatus for delivering fluid from or to the tank requires only a simple wiring connection between the tractor and trailer. Accordingly, the latter units may be connected and disconnected quickly and easily and without wasting any of the fluid. The wires extending between the generator on the tractor and the motor on the trailer may be conveniently led through the same cable which houses the wiring for supplying current to the usual tail light on the trailer. The hose reel, electric motor and pump are located on the trailer where there is ample space to accommodate these parts and where they may be concealed under or within the body of the trailer.

For a better understanding of the invention reference may be had to the accompanying drawings, in which, Fig. 1 is a side view of one form of the new vehicle, showing the electric motor and pump on the tank trailer;

Fig. 2 is a similar view of the opposite side of the vehicle, showing the meter and the hose on the tank trailer;

Fig. 3 is a diagrammatic plan view of the vehicle shown in Figs. 1 and 2, and

Fig. 4 is an enlarged detail view of the variable speed transmission between the engine and the generator on the tractor.

Referring to the drawings, the numeral 10 designates a tractor of any desired form which is connected to a tank trailer 11 by a suitable coupling or swivel joint, such as a fifth wheel 12. The trailer includes the usual chassis and a tank 11' mounted on the chassis, the tank being housed in the body 13 of the trailer and provided at the top with openings (not shown) to which access may be had through hinged covers 14 on the body, for the purpose of filling the tank. On opposite sides of the trailer body are doors 15 and 16 leading to compartments 17 and 18, respectively, located under the sides of the tank which are preferably rounded.

The tractor 10 includes an engine 20, which may be of the internal combustion type, having a main shaft 21 (Fig. 4) connected to the rear wheels of the tractor through the usual transmission. A gear box 22 is mounted on the frame of the tractor near the engine, and a sprocket wheel 23 on the engine shaft is connected through a chain 24 to a sprocket wheel 25 mounted in the gear box on a rotatable shaft 26. A sleeve 27 is splined on the shaft 26 and carries a small gear 28 and a larger gear 29 which turn with the sleeve. At the rear end of the sleeve 27 is a collet 30 which coacts with a lever 31 pivoted at its lower end in the gear box. The lever 31 is bifurcated and has two arms (not shown) which extend into the peripheral groove of the collet. At its upper end, the lever 31 is connected to a rod 32 which extends through the usual control panel 10' of the tractor and is provided at its end with a knob 32'. The gears 28 and 29 are adapted to mesh with gears 33 and 34, respectively, mounted on the shaft of a generator 35. When the knob 32' is pushed inwardly, it moves the rod 32 and lever 31 to the position shown in Fig. 4, wherein the gear 28 meshes with gear 33 and drives the generator from the engine at a relatively low speed. However, when the knob 32' is drawn outwardly from the control panel, the lever 31 moves the collet and sleeve 27 rearwardly on shaft 26, so that gear 28 is moved out of mesh with gear 33 and the larger gear 29 is caused to mesh with the smaller gear 34, whereby the generator is driven at a considerably higher speed.

A cable 37 leads from the generator 35 and conducts wiring (not shown) to a two-way switch 38 mounted on the control panel. When the switch 38 is in one position, it connects the generator through a cable 39 to the usual storage battery 40, from which wiring is led through a cable 41 to a light switch 42 on the control panel. A cable 43 conducts wiring from the light switch to the headlights 43' of the tractor, and another cable 44 conducts wiring from the light switch to a socket 45 mounted in back of the cab of the tractor. Thus, when the light switch 42 is turned on, current is supplied from the battery to the headlights 43' and the terminals of the socket 45.

When the two-way switch 38 is in the other position, it supplies current from the generator through a cable 47 to the socket 45, which is provided with four female terminals (not shown), two for the wires leading from the light switch 42 and two for the wires leading from the two-way switch 38. A connecting cable 48 is provided at one end with a plug 49 having four prongs (not shown), one in each of the female members of the socket 45, and at the opposite end with another plug which fits into a similar socket in a terminal box 50 mounted on the front end of the trailer body. From the box 50, a cable 51 leads under the trailer body to the rear end thereof and supplies current to the usual tail lights 52 from the two terminals in the box 50 which are connected through the cables 48 and 44 to the light switch 42. Accordingly, the tail lights 52 on the trailer are supplied with current from battery 40 whenever the light switch 42 is turned on to energize the headlights.

A smaller cable 54 is led from the cable 51 intermediate the ends of the latter and supplies an electric motor 55 with current from the two terminals of the box 50 which are connected through the cables 48 and 47 to the two-way switch 38. The motor 55 is mounted in the compartment 17 of the trailer and is connected through a variable speed transmission 56 to a pump 57 in the same compartment. At its inlet end, the pump is connected through a conduit 58 and a valve 59 to a pipe 60 which, in turn, is connected to the interior of the tank 12. A pipe-line 61 leading from the outlet end of the pump extends under the tank to the compartment 18 on the opposite side of the trailer, where it is connected to a flow-meter 62 including an indicator 62' which registers the volume of fluid passing through the flow-meter. The outlet end of the flow-meter is connected to a hose 63 which is wound around a reel 64 rotatably mounted in the compartment 18.

When the vehicle is in transit, the knob 32' is in its innermost position near the control panel 10' so that the generator is connected to the tractor engine through the low speed gearing 33 and 28, as shown in Fig. 4. Also, the two-way switch 38 is in position to connect the generator 35 to the battery 40 and disconnect it from the socket 45, whereby the battery receives a charge from the generator. When the vehicle arrives at its destination, the hose 63 is unwound from the reel 64 and inserted in the tank or other receptacle to which the fluid is to be delivered. Before the fluid is pumped from the trailer tank, the knob 32' is drawn outwardly from the control panel, thereby meshing the gears 29 and 34 so that the generator will be driven at a higher speed by the tractor engine, and the two-way switch 38 is actuated to disconnect the generator from the storage battery 40 and connect it to the socket 45. The generator, when the engine is operating, generates current which is conducted through the cable 47, socket 45, plug 49, cable 48, switch box 50, and cable 54 to the electric motor 55, causing the latter to drive the pump through the transmission 56. The fluid drawn from the tank 12 into the pump is thus forced through the pipe-line 61 and meter 62 into the hose 63, through which it passes to the point of delivery.

With this construction, the bulk of the apparatus for pumping the fluid from the trailer tank is located on the trailer itself, the only parts of the apparatus on the tractor being the variable speed transmission 22, the two-way switch 38 and the wiring between the switch 38 and the trailer, which occupy only a small space. The motor 55 and pump 57, as well as the flow-meter and the hose reel, are disposed in a compact arrangement in the trailer body on opposite sides of the tank, where the space for these parts is readily available. When the pumping apparatus is not in use, the doors 15 and 16 of the trailer compartments 17 and 18, respectively, are closed so as to conceal the pumping apparatus, whereby the vehicle presents a pleasing appearance.

It will be observed that the pumping apparatus may be made ready for operation by only a few simple manipulations, that is, by pulling out the knob 32' of the variable speed transmission and actuating the two-way switch 38, and when the delivery of the fluid is completed, the vehicle may be prepared for transit by simply pushing the knob 32' inwardly and actuating the switch 38 to its opposite position. During the operation of the pump mechanism or while the vehicle is in transit, the headlights 43' and tail lights 52 may be turned on or off at will by operating the light switch 42. The tank trailer may be readily disconnected from the tractor by uncoupling the two units and removing the plug 49 from its socket 45. Preferably, one of the four prongs on the plug is of a different size than the others and fits in a female member of the same size in the socket 45, so that when the trailer is connected to the tractor the plug 49 will be inserted in its proper position in the socket. The rate of delivery of the fluid from the trailer tank may be easily controlled by adjusting the variable speed transmission 56 between the electric motor and the fluid pump.

The generator 35 may be of any desired type adapted to produce sufficient current to operate the motor 55. It is common in automotive vehicles to provide means for preventing any charging of the storage battery by the generator when the engine is idling, so that the battery is charged only when the engine speed is increased. When such means are employed on the new vehicle, the variable speed transmission 22 provides the usual speed ratio between the engine and the generator, in one position of the knob 32', whereby the battery does not receive a charge when the engine idles. However, when the knob 32' is moved to its opposite position to mesh the gears 29 and 34 and the switch 38 is actuated to connect the generator to the motor 55, the engine while idling drives the generator at a sufficiently high speed to generate enough current to operate the motor.

I claim:

1. In a vehicle comprising a tractor and a tank trailer coupled to the tractor for transporting fluids, the combination of a generator on the tractor, means for connecting the generator to the tractor engine, a pump on the trailer on one side of the trailer tank for delivering fluid from the tank, a conduit connecting the inlet side of the pump to the interior of the tank, a hose reel mounted on the trailer on the opposite side of the tank, a hose wound on the reel and having a connection extending transversely of the tank to the outlet side of the pump, an electric motor on the trailer for driving the pump, and wiring leading from the tractor to the trailer for supplying current to the motor from the generator.

2. In a vehicle comprising a tractor and a tank trailer coupled to the tractor for transporting fluids, the combination of a generator on the tractor, means for connecting the generator to the tractor engine, an electric motor on the trailer on one side of the trailer tank, wiring leading from the tractor to the trailer for supplying current to the motor from the generator, a pump mounted on the trailer on said side of the tank and operable by the motor to deliver fluid from the tank, a conduit connecting the inlet side of the pump to the interior of the tank, and a hose on the trailer on the opposite side of the tank and having a connection under the tank to the outlet side of the pump.

3. In a tank trailer, the combination of a chassis having a body mounted thereon and a tank housed in the body and having rounded sides, the tank and the body forming compartments on opposite sides of the vehicle under the sides of the tank, a pump mounted in one of said compartments and connected at its inlet end to the interior of the tank, a hose in the other compartment connected to the outlet end of the pump, and driving means on the trailer for operating the pump.

4. In a vehicle including a tractor and a tank trailer coupled to the tractor, the combination of a storage battery on the tractor and a generator on the tractor for charging the storage battery and adapted to be driven by the tractor engine, an electric motor on the trailer adapted to be energized by the generator, a pump on the trailer operable by the motor and connected at its inlet end to the interior of the trailer tank, wiring connecting the generator and the battery for conducting to the battery a relatively small charging current, wiring extending from the tractor to the trailer for connecting the generator and said motor and conducting to the motor a relatively large current, a switch for selectively connecting the generator through said wiring to one of said battery and motor while disconnecting it from the other, and a variable speed transmission between the tractor engine and the generator for driving the generator at two different speeds at a constant engine speed and thereby supplying selectively said two different currents.

5. In a vehicle comprising a tractor and a trailer chassis coupled to the tractor, the combination of a body on the chassis, a tank housed in the body, the tank and the body forming compartments on opposite sides of the tank, a pump mounted in one of said compartments and connected at its inlet end of the interior of the tank, a hose in the other compartment connected to the outlet end of the pump, a generator on the tractor, means for connecting the generator to the tractor engine, an electric motor in one of said trailer compartments operable to drive the pump, and wires leading from tractor to the trailer for supplying current to the motor from the generator, whereby power developed by the tractor engine is utilized to pump fluid from the tank.

H. RUSS VAN VLECK.